US008775856B1

(12) United States Patent
An et al.

(10) Patent No.: US 8,775,856 B1
(45) Date of Patent: Jul. 8, 2014

(54) SYSTEM AND METHOD FOR GENERATING CLOCK SIGNAL FOR A PLURALITY OF COMMUNICATION PORTS BY SELECTIVELY DIVIDING A REFERENCE CLOCK SIGNAL WITH A PLURALITY OF RATIOS

(75) Inventors: Hongming An, San Diego, CA (US); Jun Ye, Shenzhen (CN); Christopher Thomas, San Diego, CA (US); CongQing Xiong, Shenzhen (CN)

(73) Assignee: SMSC Holdings S.A.R.L., Luxembourg (LU)

( * ) Notice: Subject to any disclaimer, the term of this patent is extended or adjusted under 35 U.S.C. 154(b) by 453 days.

(21) Appl. No.: 12/721,447

(22) Filed: Mar. 10, 2010

(51) Int. Cl.
 *G06F 1/00* (2006.01)
 *G06F 1/12* (2006.01)
(52) U.S. Cl.
 USPC .......................................... 713/501; 713/400
(58) Field of Classification Search
 USPC .......................................... 713/400, 501, 500
 See application file for complete search history.

(56) References Cited

U.S. PATENT DOCUMENTS

| | | | |
|---|---|---|---|
| 6,194,969 B1 * | 2/2001 | Doblar | 331/2 |
| 6,618,462 B1 * | 9/2003 | Ross et al. | 377/48 |
| 7,433,263 B2 * | 10/2008 | Kim | 365/233.1 |
| 2004/0098430 A1 * | 5/2004 | Linkewitsch | 708/270 |
| 2006/0158269 A1 * | 7/2006 | Gibet et al. | 331/57 |
| 2006/0285551 A1 * | 12/2006 | Barker et al. | 370/465 |
| 2007/0245094 A1 * | 10/2007 | Lee et al. | 711/149 |
| 2008/0074205 A1 * | 3/2008 | Chen et al. | 331/74 |
| 2010/0275037 A1 * | 10/2010 | Lee et al. | 713/189 |

OTHER PUBLICATIONS

Yang et al., A Dual-Mode Truly Modular Programmable Fractional Divider Based on a 1/1.5 Divider Cell, IEEE Microwave and Wireless Components Letters, vol. 15, No. 11, Nov. 2005, pp. 754-756.
Leenaerts et al., Circuit Design for RF Transceivers, 2005, pp. 291-292.

* cited by examiner

*Primary Examiner* — Thomas Lee
*Assistant Examiner* — Phil Nguyen
(74) *Attorney, Agent, or Firm* — King & Spalding L.L.P.

(57) ABSTRACT

Various techniques are provided to generate a plurality of reference clock signals using a single reference clock signal generator. In one example, a clock signal generation system includes a reference clock signal generator adapted to provide a reference clock signal. The system also includes a plurality of dividers adapted to divide the reference clock signal using different ratios to provide a plurality of communication port clock signals. The system also includes a plurality of different communication ports adapted to receive the communication port clock signals and adapted to operate in accordance with different communication protocols using the communication port clock signals.

23 Claims, 7 Drawing Sheets

SYSTEM AND METHOD FOR GENERATING CLOCK SIGNAL FOR A PLURALITY OF COMMUNICATION PORTS BY SELECTIVELY DIVIDING A REFERENCE CLOCK SIGNAL WITH A PLURALITY OF RATIOS

BACKGROUND

1. Technical Field

Embodiments of the present disclosure generally relate to clock signal generation, and more particularly to clock signal generation using a single clock oscillator in systems that may be used to interface with a variety of different devices over various ports.

2. Related Art

Universal Serial Bus (USB) is the most popular and widely used protocol that has been adopted for communications between computers and peripheral devices. A new USB 3.0 protocol has been developed that will open up new designs in next-generation designs such as digital video delivery and display, external media devices such as Blu-Ray drives, personal computers and server market applications, external HDD storage, and other applications. The USB 3.0 protocol has applied learning from other high-speed serial standards such as PCI Express and Serial Advanced Technology Attachment (SATA).

The USB 3.0 protocol has data transfer rates of 5 Gbps, over 10 times faster than the typical USB 2.0. However, these faster rates may pose significant signal integrity issues and clock jitter requirements that impact system stability and performance in next generation designs.

SUMMARY

Various techniques are provided to generate a plurality of reference clock signals using a single reference clock signal generator. In one embodiment, a clock signal generation system includes a reference clock signal generator adapted to provide a reference clock signal. The system also includes a plurality of dividers adapted to divide the reference clock signal using different ratios to provide a plurality of communication port clock signals. The system also includes a plurality of different communication ports adapted to receive the communication port clock signals and adapted to operate in accordance with different communication protocols using the communication port clock signals.

In another embodiment, a method of generating a plurality of clock signals includes providing a reference clock signal using a reference clock signal generator. The method also includes dividing the reference clock signal using a plurality of dividers configured with different ratios to provide a plurality of communication port clock signals. The method also includes providing the communication port clock signals to a plurality of different communication ports configured to operate in accordance with different communication protocols.

In another embodiment, a clock signal generation system includes means for providing a reference clock signal. The system also includes means for dividing the reference clock signal using different ratios to provide a plurality of communication port clock signals. The system also includes a plurality of different communication ports adapted to receive the communication port clock signals and adapted to operate in accordance with different communication protocols using the communication port clock signals.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE FIGURES

Embodiments of the present invention and their advantages are best understood by referring to the detailed description that follows. It should be appreciated that like reference numerals are used to identify like elements illustrated in one or more of the figures.

DETAILED DESCRIPTION

In accordance with embodiments further described herein, various techniques are provided to generate a plurality of reference clock signals using a single reference clock signal generator implemented using, for example, a single crystal oscillator. Such reference clock signals may be used to facilitate communication by different types of devices over a variety of different communication ports configured to operate in accordance with different communication protocols. In one embodiment, such ports may include, for example, USB 2.0 ports, USB 3.0 ports, and/or SATA ports. For example, a single common reference clock signal may be used to provide associated communication port clock signals (e.g., also referred to as reference clock signals) for USB 3.0 ports (e.g., operating at 100 MHz), USB 2.0 ports (e.g., operating at 12 MHz) and SATA ports (e.g., operating at 25 MHz or 100 MHz). In various embodiments, clock components and related circuitry used in the system may exceed the jitter requirements of USB 3.0 5.0 Gbps data rates.

Advantageously, the use of the single reference clock generator may reduce implementation costs in comparison to other clock implementations using multiple reference clock generators. Such cost savings may be particularly advantageous in implementations where multiple crystal oscillators (e.g., operating at different frequencies) may be replaced by a single crystal oscillator.

Figure 1:
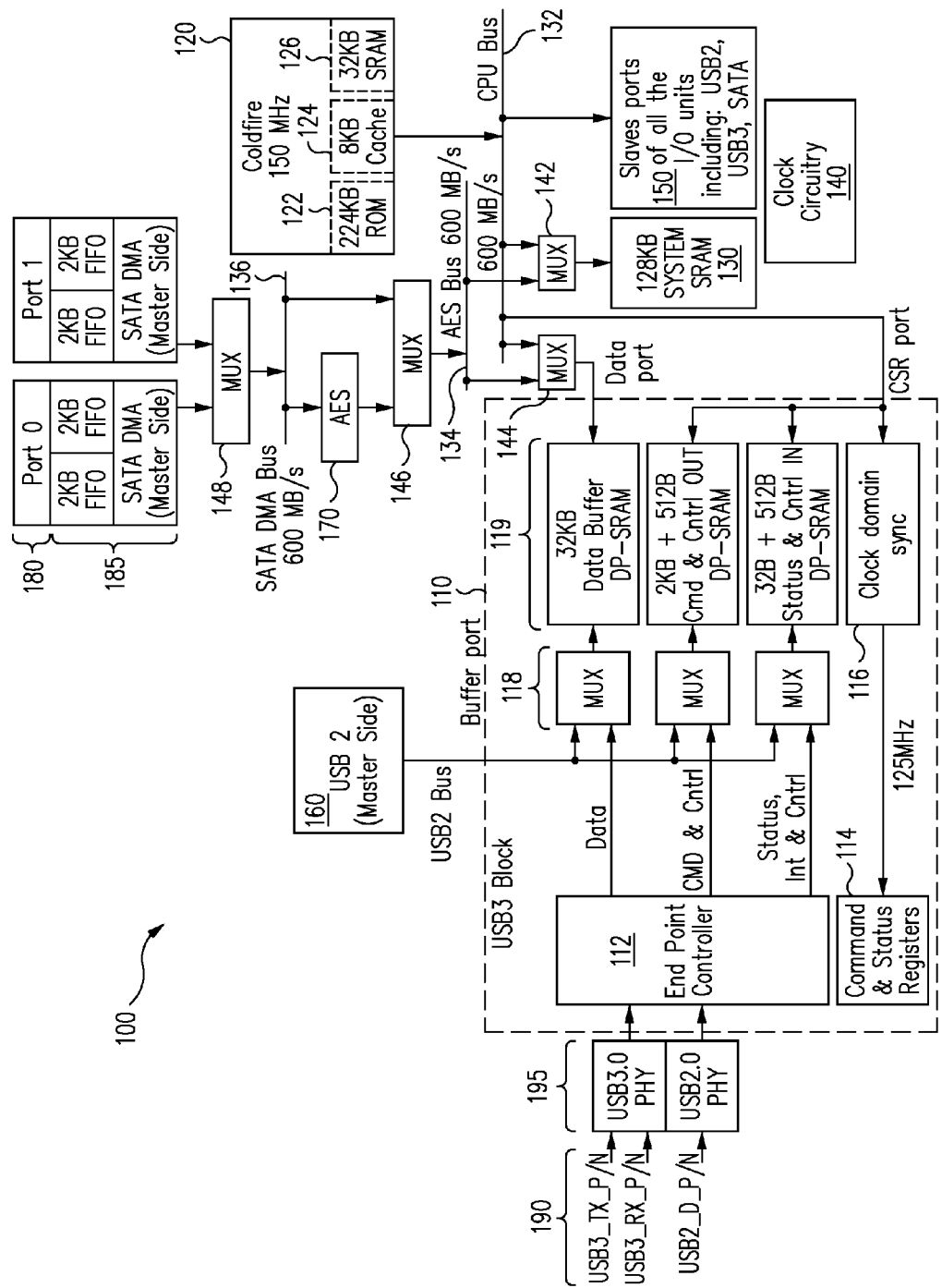
FIG. 1 illustrates a block diagram of a system that may be used to interface with a variety of different devices over various ports in accordance with an embodiment of the present invention.

FIG. 1 illustrates a block diagram of a system 100 which may be used to interface with a variety of different devices over various ports. In one embodiment, system 100 may be implemented as a system on a chip that manages communications between a host device and one or more other devices. For example, system 100 may be used to provide bridging, hosting, and/or hub operations in accordance with various communication protocols.

System 100 includes a device controller 110, a processor 120, system memory 130, clock circuitry 140, slave ports 150, a configuration port 160, an encryption block 170, communication ports 180, physical layer components 185, communication ports 190, and physical layer components 195.

As shown in FIG. 1, system 100 includes various busses 132, 134, and 136, and multiplexers 142, 144, 146, and 148 to facilitate communications between device controller 110, processor 120, system memory 130, slave ports 150, encryption block 170, physical layer components 185, and physical layer components 195.

Device controller 110 may be configured to manage communications to and from physical layer components 195 associated with communication ports 190. For example, device controller 110 may be used to host one or more devices connected to communication ports 190. In one embodiment, device controller 110 may be implemented as a universal serial bus (USB) controller configured to permit system 100 to operate as a USB host to one or more USB slave devices connected to communication ports 190. As shown in FIG. 1, device controller 110 includes an end point controller 112, command and status registers 114, a clock domain synchronization block 116, multiplexers 118, and various memory blocks and buffers 119.

Processor 120 may be implemented, for example, as a Coldfire processor operating at 150 MHz with various associated memories and caches 122, 124, and 126. Processor 120 may be used, for example, to perform various bridging, hosting, and/or hub operations for communications exchanged between communication ports 180 and 190 as well as slave ports 150.

System memory 130 may be used by processor 120 and/or other components of system 100 to support the various operations of system 100. Clock circuitry 140 may be used to provide one or more clock signals to system 100. Slave ports 150 may be used to interface system 100 with various types of slave devices as may be desired in various implementations. Configuration port 160 may be implemented, for example, as a USB 2.0 port used to configure system 100 for desired operations. Encryption block 170 may be implemented, for example, to perform Advanced Encryption Standard (AES) encryption on data passed between communication ports 180 and the rest of system 100.

Communication ports 180 may be implemented, for example, as storage media device ports configured to support communications with storage media devices such as hard drives, flash drives (e.g., thumb drives, solid state drives, or others), optical storage media (e.g., CD-ROM, DVD, HD-DVD, Blu-Ray, or others), or other appropriate storage media devices. Such storage media device ports may be implemented in accordance with Serial Advanced Technology Attachment (SATA) interfaces, external SATA (eSATA) interfaces, Parallel Advanced Technology Attachment (PATA) interfaces, flash memory interfaces, or others. In the embodiment shown in FIG. 1, communication ports 180 are implemented as SATA interfaces. Physical layer components 185 may be used to facilitate communications between communication ports 180 and the rest of system 100.

Communication ports 190 may be implemented, for example, in accordance with various communication standards such as, for example, USB 3.0, USB 2.0, Firewire (e.g., IEEE 1394), or others. In the embodiment shown in FIG. 1, communication ports 190 are implemented as USB 2.0 and USB 3.0 ports. Physical layer components 195 may be used to facilitate communications between communication ports 190 and the rest of system 100.

In one embodiment, an external host device may be connected to one of communication ports 190. In this embodiment, system 100 may be configured to host one or more devices connected to communication ports 180 and/or 190 on behalf of the host device. In this regard, system 100 may facilitate communications between the host device and/or the various hosted devices.

In one embodiment, clock circuitry 140 may include reference clock components and related circuitry further described herein.

According to one or more embodiments, a single crystal oscillator may be used to provide a plurality of reference clock signals for communication ports 160, 180, and 190 of system 100. For example, in one embodiment, a USB 3.0 port may operate using a 100 MHz reference clock signal, a USB 2.0 port may operate using a 12 MHz reference clock signal, and a Serial Advanced Technology Attachment (SATA) port may operate using 25 MHz or 100 MHz reference clock signals. In this regard, a single crystal oscillator may be selectively divided, multiplied, and/or otherwise adjusted to provide a plurality of clock signals simultaneously to different communication ports 160, 180, and 190 of system 100 to facilitate the support of different communication protocols.

Figure 2:
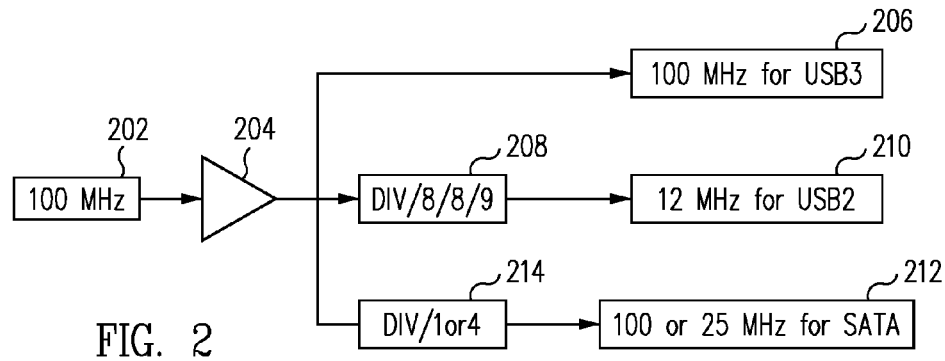
FIG. 2 illustrates a system for clock signal generation in accordance with an embodiment of the present invention.

FIG. 2 illustrates a system for clock signal generation in accordance with an embodiment of the present invention. A reference clock signal generator 202 provides a clock signal that may be first passed or transferred through a component 204 (e.g., a buffer) to a USB 3.0 port 206, a USB 2.0 port 210 and a SATA port 212. In FIG. 2, the 100 MHz reference clock signal is provided by the reference clock signal generator 202 as a single crystal oscillator. The 100 MHz reference clock signal may be provided directly to USB 3.0 port 206, which operates at 100 MHz. The 100 MHz reference clock signal may also be provided to USB 2.0 port 210, which operates at 12 MHz, via a divider 208. Furthermore, the 100 MHz reference clock signal may be provided to SATA port 212, which may operate at 100 MHz or at 25 MHz, via a divider 214.

Divider 214 may have a 1 or 4 divider pattern corresponding, respectively, to the clock signal at which SATA port 212 is operating. A 100 MHz clock signal for SATA port 212 may be generated from the 100 MHz reference clock signal with a ratio of 1, which may be accomplished with divider 214 set to device by 1 or simply pass through the 100 MHz clock signal provided by reference clock signal generator 202. Alternatively, a 25 MHz clock signal for SATA port 212 may be generated from the 100 MHz reference clock signal by setting divider 214 to divide by 4. That is, divider 214 has a divider 1 pattern when SATA port 212 operates at 100 MHz, and has a divider 4 pattern when SATA port 212 operates at 25 MHz. Divider 214 may be implemented in accordance with divider circuitry familiar to those skilled in the art.

The 12 MHz clock signal for USB 2.0 port 210 may be generated from the 100 MHz reference clock signal of clock signal generator 202 with a ratio of 8.3333, which may be accomplished with divider 208 having an 8/8/9 pattern. In this regard, divider 208 may selectively divide the reference clock signal by 8, 8, and 9 in successive clock periods, and then repeat this pattern for further clock periods. As a result, divider 208 may exhibit an average division of approximately 8.33333. Applying this division to a reference clock frequency of 100 MHz yields a divided clock of approximately 12 MHz that may be provided to USB 2.0 port 210.

In general, in a communications link, data is sampled into a latch by a clock. Ideally, in a perfect system, jitter is non-existent and data is sampled at an optimum location in a center of a data bit. However, in practice, the clock and data may become misaligned due to various physical processes. As a result, such a system may exhibit jitter. A jitter budget allocates an error to each component of the system, e.g., to each of the components of a transmitter, media and a receiver. In one embodiment, a total jitter budget may be less than a total unit interval (UI) or a sampling error may occur.

In the embodiment shown in FIG. 2, the clock signal for USB 2.0 port 210 may have a deterministic jitter of 3.33 ns at the rise/fall edges of the clock (40 mUI). The deterministic jitter corresponds to a 4 MHz spur in the reference clock signal from reference clock signal generator 202 and may be largely suppressed by a phase locked loop (PLL) bandwidth of the USB 2.0 port 210. The PLL bandwidth may be in a range of approximately 100-500 KHz. Accordingly, the embodiment shown in FIG. 2 provides superior jitter performance, particularly for USB 2.0 port 210, while saving space and power.

Figure 3:
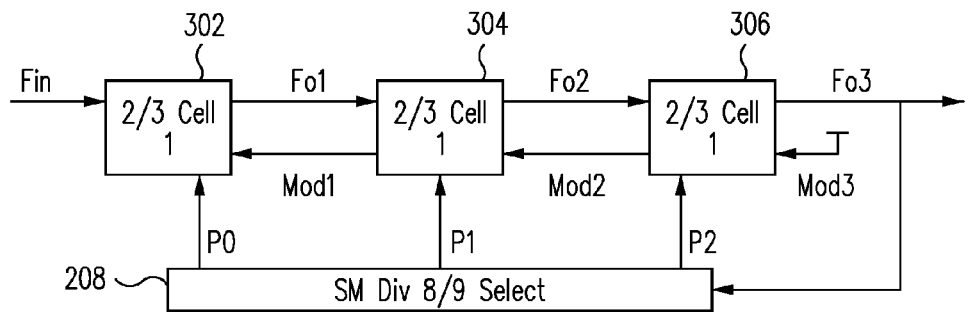
FIG. 3 illustrates an 8/8/9 divider in accordance with an embodiment of the present invention.

FIG. 3 illustrates an 8/8/9 divider in accordance with an embodiment of the present invention. For example, the divider of FIG. 3 may be used to implement divider 208 of FIG. 2 having an 8/8/9 pattern in accordance with an embodiment.

In FIG. 3, a chain of 2/3 cells 302, 304, 306 are connected in a cascade manner. Signals P0, P1, and P2 may be selected according to divider 208. The design illustrated in FIG. 3 may be implemented in accordance with techniques known in the art and may be adapted to different input frequency requirements by simply adding or removing divider cells in the high frequency part of the chain. The 2/3 cells will be described in more detail below in connection with FIG. 4.

Figure 4:
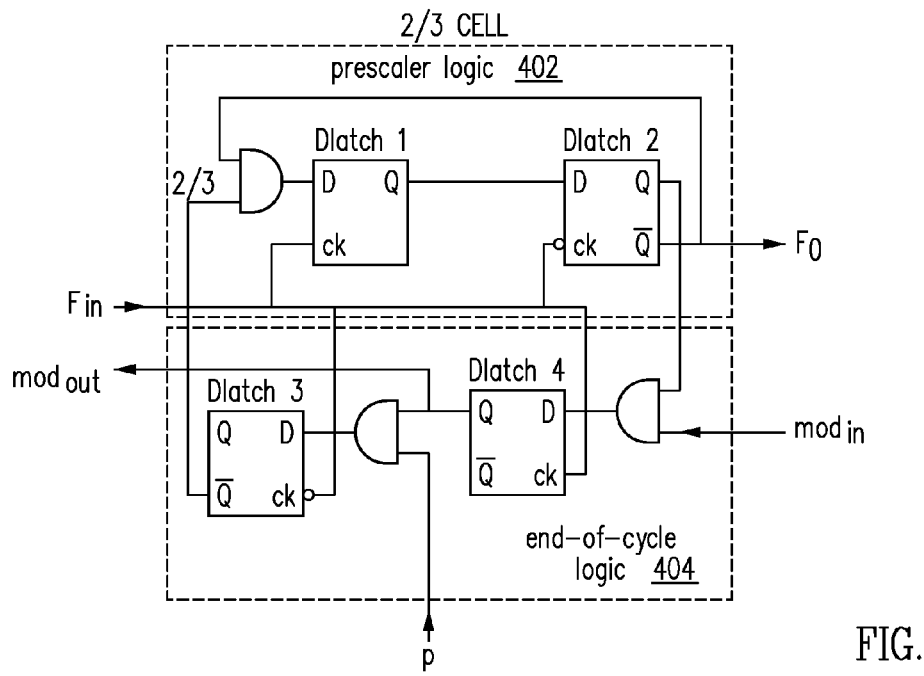
FIG. 4 illustrates a 2/3 divider cell in accordance with an embodiment of the present invention.

It will be appreciated that various techniques known in the art may be used to implement 2/3 divider circuits to provide 2/3 divider cells. For example, FIG. 4 illustrates a 2/3 divider cell in accordance with an embodiment of the present invention. The 2/3 divider cell of FIG. 4 may correspond to any of the 2/3 divider cells 302, 304, or 306 illustrated in the embodiment shown in FIG. 3.

As known in the art, the 2/3 divider cell includes two functional blocks, a prescaler logic block 402 and an end-of-cycle logic block 404. Upon control by end-of-cycle block 404, prescaler logic block 402 divides the frequency of the input Fin signal by either 2 or 3, and outputs the divided clock signal to the next cell in the chain. The division ratio of the cell depends on the state of the $mod_{in}$ and p signals. In a division cycle, the $mod_{in}$ signal becomes active at which time the state of the p signal is checked. If p=1, the end-of-cycle logic block 404 forces prescaler logic block 402 to swallow one extra period of the input signal. That is, the cell divides by 3. If p=0, the 2/3 cell stays in division by 2 mode. Regardless of the state of the p signal, the end-of-cycle logic block 402 reclocks the $mod_{in}$ signal and outputs it to the preceding cell in the chain (by the $mod_{out}$ signal).

Figure 5:
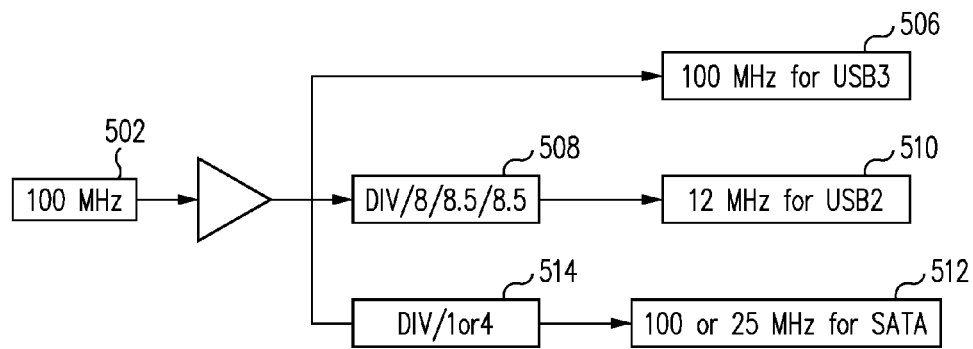
FIG. 5 illustrates a system for clock signal generation in accordance with another embodiment of the present invention.

FIG. 5 illustrates a system for clock signal generation in accordance with another embodiment of the present invention. FIG. 5 is similar to FIG. 2 described above except that in FIG. 5, a divider 508 having an 8/8.5/8.5 pattern is used. It will be appreciated that the other components including the 100 MHz reference clock signal generator 502, USB 3.0 port 506, USB 2.0 port 510, SATA port 512, and divider 514 may be implemented, for example, using the techniques already described with regard to FIG. 2.

In FIG. 5, the 100 MHz reference clock signal may be provided to USB 2.0 port 510, which operates at 12 MHz, via divider 508. The 12 MHz clock signal for USB 2.0 port 510 may be generated from the 100 MHz reference clock signal of clock signal with a ratio of 8.3333, which may be accomplished with divider 508 having an 8/8.5/8.5 pattern. In this regard, divider 508 may selectively divide the reference clock signal by 8, 8.5, and 8.5 in successive clock periods, and then repeat this pattern for further clock periods. As a result, divider 508 may exhibit an average division of approximately 8.33333. Applying this division to a reference clock frequency of 100 MHz yields a divided clock of approximately 12 MHz that may be provided to USB 2.0 port 510.

In the embodiment shown in FIG. 5, the clock signal for USB 2.0 port 510 may have a deterministic jitter of 1.66 ns at the rise/fall edges of the clock (20 mUI). The deterministic jitter corresponds to a 4 MHz spur in the reference clock signal from reference clock signal generator 202 and may be largely suppressed by a PLL as described with regard to FIG. 2. Accordingly, the embodiment shown in FIG. 5, compared to the embodiment shown in FIG. 2, has half the jitter or 6 dB less for a 4 MHz spur. Thus, even more superior jitter performance may be obtained for USB 2.0 port 510 while saving space and power.

Figure 6:
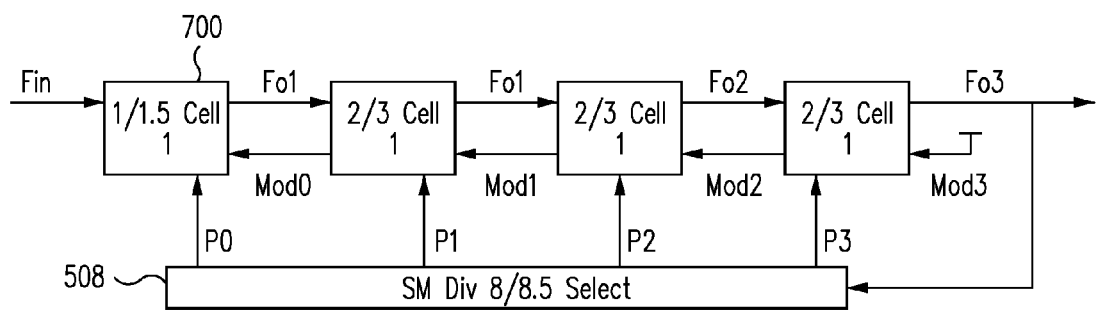
FIG. 6 illustrates an 8/8/8.5 divider according to another embodiment of the present invention.

FIG. 6 illustrates an 8/8/8.5 divider according to another embodiment of the present invention. In one embodiment, the divider of FIG. 6 may be implemented in accordance with techniques known in the art to implement divider 508 to provide an 8/8.5/8.5 pattern.

Divider 508 having an 8/8.5/8.5 pattern is similar in operation and architecture to divider 208 having an 8/8/9 pattern described above with respect to the embodiment shown in FIG. 3, except that an additional 1/1.5 divider cell (e.g., to support a fractional non-integer ratio) is placed in front of a chain of one or more 2/3 divider cells, which are connected in a cascade manner. Signals P0, P1, P2, and P3 may be selected according to divider 508. As known in the art, the design illustrated in the embodiment shown in FIG. 6 may be adapted to different input frequency requirements by simply adding or removing divider cells in the high frequency part of the chain. The 1/1.5 divider cell will be described in more detail below in connection with FIG. 7.

Figure 7:
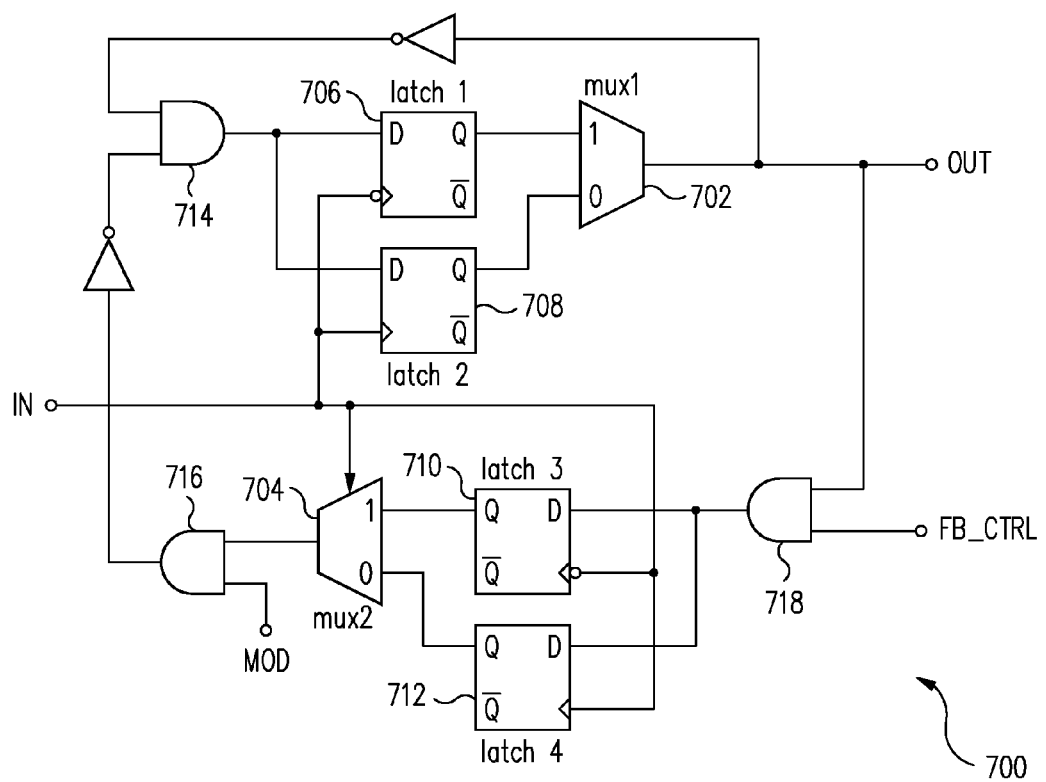
FIG. 7 illustrates a 1/1.5 divider cell in accordance with an embodiment of the present invention.

It will be appreciated that various techniques known in the art may be used to implement 1/1.5 divider circuits to provide 1/1.5 divider cells. For example, FIG. 7 illustrates a 1/1.5 divider cell in accordance with an embodiment of the present invention. Operationally, divider cell 700 triggers on the rising or falling edge of an input signal IN. In FIG. 7, divider cell 700 includes two multiplexers, mux1 702 and mux2 704, four latches 706, 708, 710, and 712, and three AND gates 714, 716, and 718. This example of the structure of divider cell 700 is similar to the 2/3 divider cell described above in connection with the embodiment shown in FIG. 4, except the serially-connected latches in FIG. 4 are replaced by parallel-connected latches 706, 708, 710, and 712 in combination with a multiplexer 702 or 704. One of the latches may be enabled by the positive edge, and the other may be enabled by the negative edge of the input signal IN with their outputs selected by the corresponding multiplexer. When MOD and FB CTRL are both high, divider cell 700 is in the divide-by-1.5 mode. When either MOD or FB CTRL is low, the output signal of latch1 706 remains high (or low) while latch2 708 stays low (or high) and the feedback signal is always high. Thus, the OUT signal simply tracks the input signal IN, i.e., divided by 1.

Figure 8:
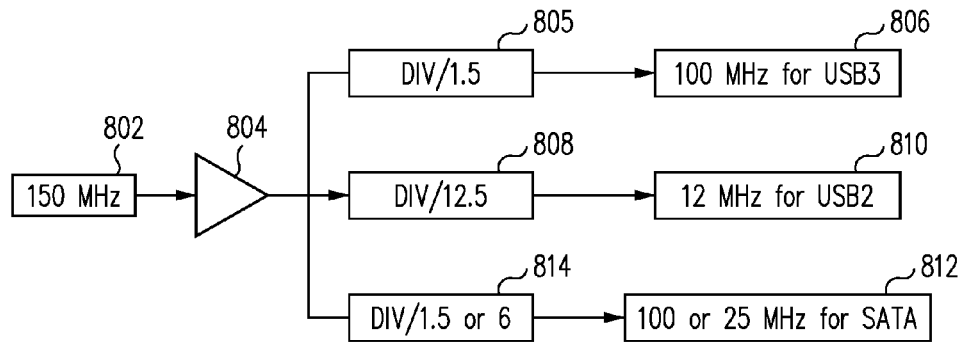
FIG. 8 illustrates a system for clock signal generation in accordance with another embodiment of the present invention.

FIG. 8 illustrates a system for clock signal generation in accordance with another embodiment of the present invention. In FIG. 8, a 150 MHz reference clock signal (compared to a 100 MHz reference clock signal in FIGS. 2 and 5) is provided by a reference clock signal generator 802 (e.g., implemented by a single crystal oscillator). Reference clock signal generator 802 provides a clock signal that may be first passed or transferred through a component 804 (e.g., a buffer) to a USB 3.0 port 806, a USB 2.0 port 810, and a SATA port 812. The 150 MHz reference clock signal may be provided to USB 3.0 port 806, which operates at 100 MHz, via a divider 805. The 150 MHz reference clock signal may also be provided to USB 2.0 port 810, which operates at 12 MHz, via a divider 808. Furthermore, the 150 MHz reference clock signal may be provided to SATA port 812, which may operate at 100 MHz or at 25 MHz, via a divider 814.

The 100 MHz clock signal for USB 3.0 port 806 may be generated from the 150 MHz reference clock signal of reference clock signal generator 802 with divider 805 having a ratio of 1.5. For example, in one embodiment, divider 805 may be implemented in accordance with divider cell 700.

The 12 MHz clock signal for USB 2.0 port 810 may be generated from the 150 MHz reference clock signal of clock signal generator 802 with divider 808 having a ratio of 12.5 (i.e., a fractional non-integer ratio). In various embodiments, the divider ratio of 12.5 may be implemented using a divider pattern of 12/13 in a similar manner as the implementation described herein with, regard to FIG. 3 with some deterministic jitter, or implemented using a single divider in a similar manner as the implementation described herein with regard to FIG. 6 without deterministic jitter.

Divider 814 may have a 1.5 or 6 ratio corresponding, respectively, to the clock signal at which SATA port 812 is operating. That is, divider 814 has a ratio of 1.5 when SATA port 812 operates at 100 MHz, and has a ratio of 6 when SATA port 812 operates at 25 MHz. The 100 MHz clock signal for SATA port 812 may be generated from the 150 MHz reference clock signal with a ratio of 1.5, which may be accomplished with divider 814 having a 1.5 pattern (e.g., using divider cell 700 previously described herein). Alternatively, a 25 MHz clock signal for SATA port 812 may be generated from the 150 MHz reference clock signal with divider 814 having a ratio of 6 (e.g., which may be implemented with a 3×2 pattern using appropriate divider cells of FIG. 6).

Advantageously, dividers 805, 808, and 814 may be implemented without alternating between different divider patterns. As a result, dividers 805, 808, and 814 may exhibit no deterministic jitter. Accordingly, in the embodiment shown in FIG. 8, deterministic jitter may be avoided while saving space and power.

Figure 9:
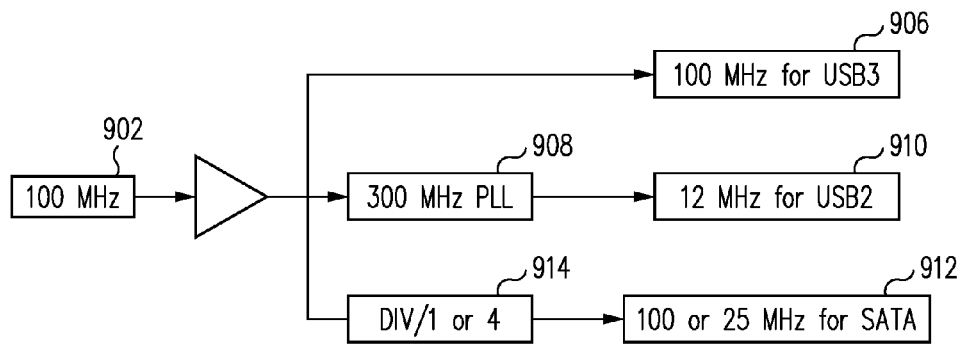
FIG. 9 illustrates a system for clock signal generation in accordance with another embodiment of the present invention.

FIG. 9 illustrates a system for clock signal generation in accordance with another embodiment of the present invention. The embodiment shown in FIG. 9 is similar to the embodiments of FIGS. 2 and 5 described above, except that in the embodiment shown in FIG. 9, a low frequency PLL 908, for example a 300 MHz PLL, is used. It will be appreciated that the other components including the 100 MHz reference clock signal generator 902, USB 3.0 port 906, USB 2.0 port 910, SATA port 912, and divider 914 may be implemented, for example, using the techniques already described with regard to FIGS. 2 and 5.

In FIG. 9, the 100 MHz reference clock signal may be provided to the USB 2.0 port 910, which operates at 12 MHz, via low frequency PLL 908. For example, the 12 MHz clock signal for USB 2.0 port 910 may be generated from the 100 MHz reference clock signal with low frequency PLL 908 having a frequency of 300 MHz or its multiple (e.g., using a ring oscillator) and a divider having a ratio of 25 as will be described in further detail below with respect to FIG. 10.

In the embodiment shown in FIG. 9, jitter performance is best for USB 3.0 port 906 and SATA port 912 based on a reference clock of 100 MHz. For USB 2.0 port 910, the use of low frequency PLL 908 and a divider having a ratio of 25 (as will be described below) avoids deterministic jitter.

Figure 10:
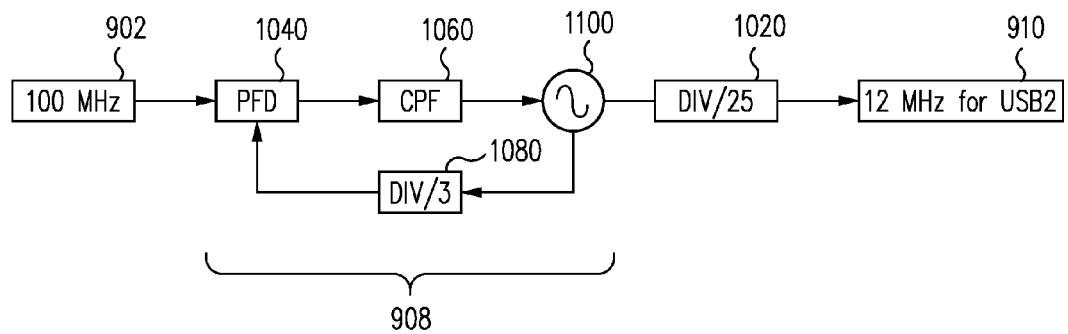
FIG. 10 illustrates a phase locked loop circuit in accordance with an embodiment of the present invention.

FIG. 10 illustrates low frequency PLL 908 in accordance with an embodiment of the present invention. A reference signal, for example a 100 MHz signal, is provided to low frequency PLL 908 from 100 MHz reference clock signal generator 902. Low frequency PLL 908 may be designed to have an output of, for example, N×300 MHz where N is a integer number. The output (e.g., the 300 MHz signal if N=1) may be provided to a divider 1020, which may be a divider having a ratio of 25, thus outputting a 12 MHz signal that may be used by USB 2.0 port 910.

As is generally known in the art, low frequency PLL 908 may include a phase frequency detector (PFD) 1040, a charge pump (CPF) 1060, an oscillator 1100, and a frequency divider 1080 connected in a feedback loop between oscillator 1100 and PFD 1040. Such components may be designed to output a particular frequency. For example, in an embodiment, frequency divider 1080 may have a ratio of 3 so that the output signal of 300 MHz may be obtained based on the 100 MHz reference signal.

Figure 11:
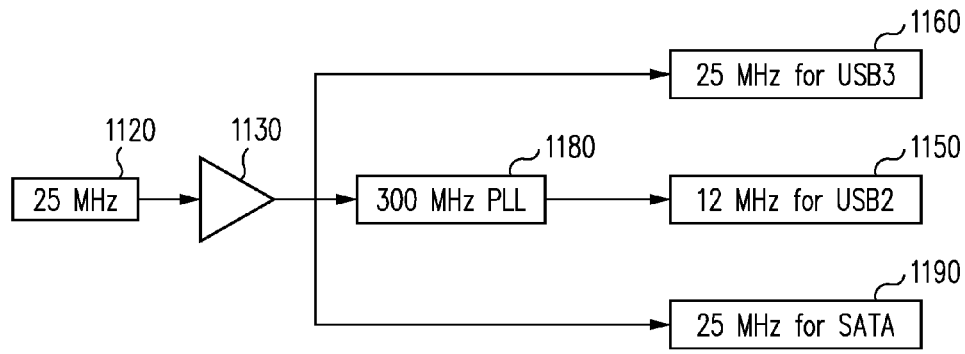
FIG. 11 illustrates a system for clock signal generation in accordance with another embodiment of the present invention.

FIG. 11 illustrates a system for clock signal generation in accordance with another embodiment of the present invention. In the embodiment shown in FIG. 11, a 25 MHz reference clock signal may be provided by a reference clock signal generator 1120 implemented using a single crystal oscillator. Reference clock signal generator 1120 provides a clock signal that may be first passed or transferred through a component 1130 (e.g., a buffer) to a USB 3.0 port 1160, a USB 2.0 port 1150 and a SATA port 1190. The 25 MHz reference clock signal may be directly provided to USB 3.0 port 1160, which operates at 25 MHz. The 25 MHz reference clock signal may also be provided to USB 2.0 port 1150, which operates at 12 MHz, via a low frequency PLL 1180. Furthermore, the 25 MHz reference clock signal may be directly provided to SATA port 1190, which operates at 25 MHz.

The 25 MHz reference clock signal from reference clock signal generator 1120 may be provided to USB 2.0 port 1150, which operates at 12 MHz, via low frequency PLL 1180. For example, the 12 MHz clock signal for USB 2.0 port 1180 may be generated from the 25 MHz reference clock signal with low frequency PLL 1180 having a frequency of N×300 MHz (where N is an integer number) or its multiple (e.g., using a ring oscillator) and a divider having a ratio of 25 as will be described in further detail below with respect to FIG. 12.

In the embodiment shown in FIG. 11, good jitter performance is obtained for USB 3.0 port 1160 and SATA port 1190 based on a reference clock of 25 MHz. For USB 2.0 port 1150, the use of low frequency PLL 1180 and a divider having a ratio of 25 (as will be described below) avoids deterministic jitter.

Figure 12:
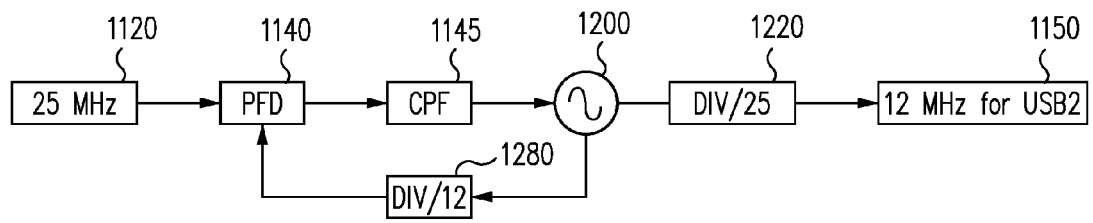
FIG. 12 illustrates a phase locked loop circuit according to another embodiment of the present invention.

FIG. 12 illustrates low frequency PLL 1180 in accordance with an embodiment of the present invention. A reference signal, for example a 25 MHz signal, is provided to low frequency PLL 1180. Low frequency PLL 1180 may be designed to have an output of, for example, 300 MHz. The output, for example, the 300 MHz signal, may be provided to a divider 1220, which may be a divider having a ratio of 25, thus outputting a 12 MHz signal that may be used by USB 2.0 port 1150.

It will be appreciated that various components of low frequency PLL 1180 including a PFD 1140, a CPF 1145, and an oscillator 1200 may be implemented, for example, in accordance with the implementation of low frequency PLL 908 of FIG. 10. Low frequency PLL 1180 also includes a frequency divider 1280 which may be implemented, for example, with a ratio of 12 so that the output signal of 300 MHz may be obtained based on the 25 MHz reference signal.

Figure 13:
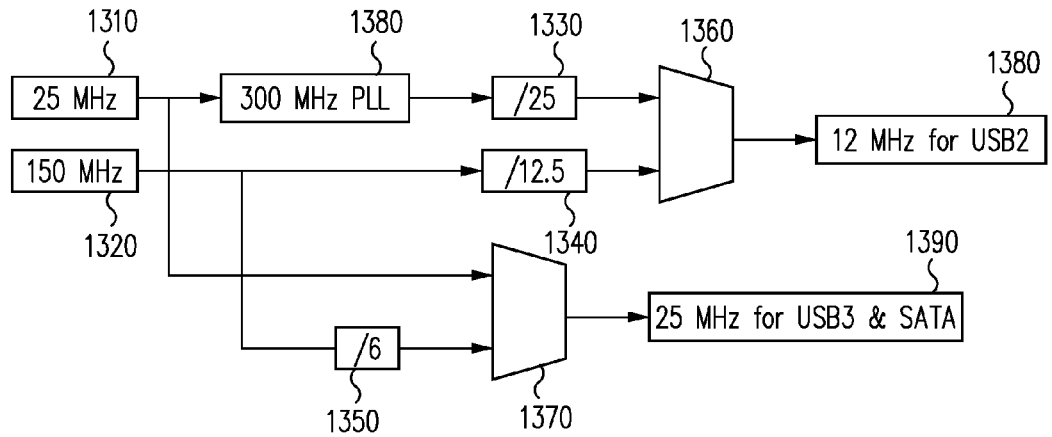
FIG. 13 illustrates a system for clock signal generation in accordance with another embodiment of the present invention.

FIG. 13 illustrates a system for clock signal generation in accordance with another embodiment of the present invention. For example, in one embodiment, the system of FIG. 13 may be implemented using various aspects of the systems of FIGS. 8 and 11.

In FIG. 13, a reference clock signal of 25 MHz or 150 MHz may be provided by a reference clock signal generator 1310 or 1320, respectively. Either reference clock signal may be selected. This dual option may be provided for back up purposes and to avoid potential risks related to power, cost, design, and/or other factors. In one embodiment, reference clock signal generator 1320 may be used as a default, and reference clock signal generator 1310 may be used as a backup reference clock signal generator (e.g., if reference clock signal generator 1320 is not available). For example, in one embodiment, a higher frequency clock (e.g., such as reference clock signal generator 1320 operating at 150 MHz) may exhibit less jitter when divided than a lower frequency clock (e.g., such as reference clock signal generator 1310 operating at 25 MHz). As a result, in various implementations, it may be preferable to select the higher frequency clock when available. The particular reference clock used by the system of FIG. 13 may be selected using multiplexers 1360 and 1370.

If a reference clock signal of 150 MHz is selected, reference clock signal generator 1320 provides the signal to a divider 1340, which has a ratio of 12.5. Multiplexer 1360 receives the resulting divided signal of 12 MHz and outputs it to a USB 2.0 port 1380, which operates at 12 MHz. Also, the 150 MHz reference clock signal is provided to a divider 1350, which has a ratio of 6. Multiplexer 1370 receives the resulting divided signal of 25 MHz and outputs it to a USB 3.0 port and/or a SATA port (collectively labeled 1390 in FIG. 13), which operate at 25 MHz.

If a reference clock signal of 25 MHz is selected, reference clock signal generator 1310 provides the signal directly to multiplexer 1370, which outputs the signal to USB 3.0 port and/or SATA port 1390, which operate at 25 MHz. Also, the 25 MHz reference clock signal is provided to a low frequency PLL 1380 (e.g., implemented in accordance with low frequency PLL 1180) and a divider 1330. Divider 1330 having a ratio of 25 then provides the resulting signal of 12 MHz (300/25) to multiplexer 1360, which outputs the signal to USB 2.0 port 1380, which operates at 12 MHz.

Figure 14:
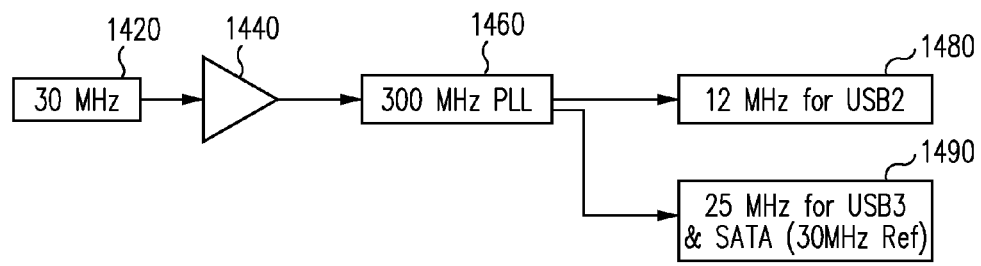
FIG. 14 illustrates a system for clock signal generation in accordance with another embodiment of the present invention.

FIG. 14 illustrates a system for clock signal generation in accordance with another embodiment of the present invention. A reference clock signal generator 1420 generates a 30 MHz reference clock signal, which is passed or transferred through a component 1440 (e.g. a buffer) to a low frequency PLL 1460. Low frequency PLL 1460 may generate a 12 MHz signal for a USB 2.0 port 1480 and may generate a 25 MHz signal for a USB 3.0 port and/or a SATA port (collectively labeled 1490 in FIG. 14) based on the reference clock signal of 30 MHz as will be described in more detailed below with respect to the embodiment shown in FIG. 15.

Figure 15:
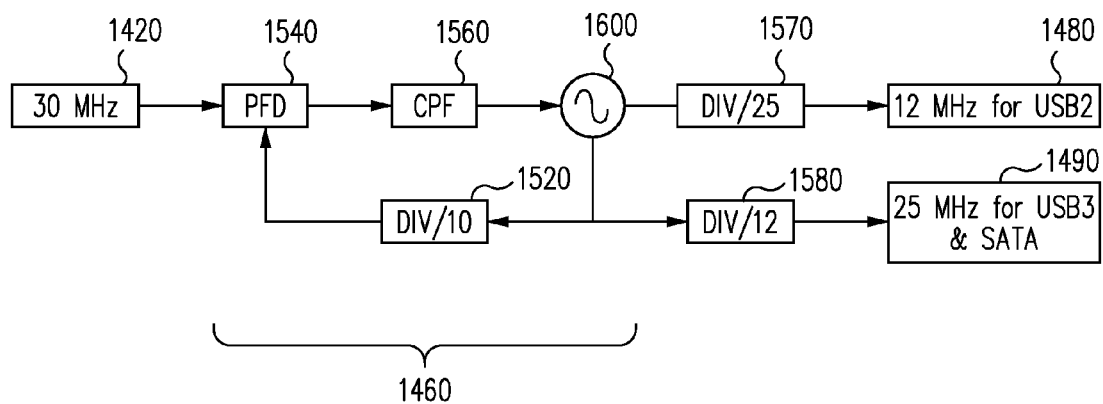
FIG. 15 illustrates a phase locked loop circuit according to another embodiment of the present invention.

FIG. 15 illustrates low frequency PLL 1460 according to another embodiment of the present invention. Reference clock signal generator 1420 generates a 30 MHz reference clock signal, which is provided to low frequency PLL 1460. It will be appreciated that various components of low frequency PLL 1460 including a PFD 1540, a CPF 1560, and an oscillator 1600 may be implemented, for example, in accordance with the implementation of low frequency PLLs 908 and 1180 of FIGS. 10 and 12. Low frequency PLL 1460 also includes a frequency divider 1520 which may be implemented, for example, with a ratio of 10 so that the output signal of 300 MHz may be obtained based on the 30 MHz reference signal. The 300 MHz signal may be provided to a divider 1570 having a ratio of 25. Divider 1570 outputs a resulting signal of 12 MHz (300/25) to USB 2.0 port 1480. Also, the 300 MHz signal may be provided to a divider 1580 having a ratio of 12. Divider 1580 outputs a resulting signal of 25 MHz (300/12) to USB 3.0 port and/or SATA port 1490. Using the embodiments provided in FIGS. 14 and 15, USB 3.0 port and/or SATA port may exhibit good jitter performance, and USB 2.0 port 1480 may exhibit no deterministic jitter.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A system comprising:
a reference clock signal generator adapted to provide a reference clock signal;
a plurality of dividers adapted to divide the reference clock signal using different ratios to provide a plurality of communication port clock signals wherein at least one of the plurality of dividers is configurable to use different ratios and wherein at least one of the plurality of communication port clock signals is generated by alternating the ratio of a configurable divider in a repeating pattern; and
a plurality of different communication ports, each one adapted to receive a single one of the communication port clock signals and adapted to operate in accordance with different communication protocols using one of the communication port clock signals, wherein at least two of the plurality of different communication ports receive different ones of said plurality of communication port clock signals.

2. The system of claim 1, wherein the reference clock signal generator comprises a single crystal oscillator.

3. The system of claim 1, wherein the different communication protocols include one or more of a Universal Serial Bus (USB) 3.0 protocol, a USB 2.0 protocol, or a Serial Advanced Technology Attachment (SATA) protocol.

4. The system of claim 1, wherein the communication port clock signals comprise one of more of a 12 MHz signal adapted to be used with a USB 2.0 port, a 25 MHz signal adapted to be used with a USB 3.0 port or a Serial Advanced Technology Attachment (SATA) port, or a 100 MHz signal adapted to be used with a USB 3.0 port or a SATA port.

5. The system of claim 1, wherein at least one of the dividers comprises a phase locked loop (PLL).

6. The system of claim 1, wherein the communication port clock signal provided by the configurable divider exhibits a frequency determined by an average of the ratios of the pattern.

7. The system of claim 1, wherein at least two of the ratios of the pattern are the same ratio to reduce jitter in the communication port clock signal provided by the divider.

8. The system of claim 1, wherein the reference clock signal is a 25 MHz signal, a 100 MHz signal, or a 150 MHz signal.

9. The system of claim 1, wherein the reference clock signal generator is a first reference clock signal generator, the reference clock signal is a first reference clock signal at a first frequency, the dividers comprise a first set of dividers, and the different ratios comprise a first set of different ratios, the system further comprising:
a second reference clock signal generator adapted to provide a second reference clock signal at a second frequency different from the first frequency; and
a second set of dividers adapted to divide the second reference clock signal using a second set of different ratios to provide the same communication port clock signals as the first set of dividers if the first reference clock signal is not available.

10. A method of generating a plurality of clock signals, the method comprising:
providing a reference clock signal using a reference clock signal generator;
dividing the reference clock signal using a plurality of dividers configured with different ratios to provide a plurality of communication port clock signals wherein at least one of the plurality of dividers is configurable to use different ratios and wherein at least one of the plurality of communication port clock signals is generated by alternating the ratio of a configurable divider in a repeating pattern; and
providing a selected single one of the communication port clock signals to each one of a plurality of different communication ports configured to operate in accordance with different communication protocols, wherein at least two of the plurality of different communication ports receive different ones of said plurality of communication port clock signals.

11. The method of claim 10, wherein the reference clock signal generator comprises a single crystal oscillator.

12. The method of claim 10, wherein the different communication protocols include one or more of a Universal Serial Bus (USB) 3.0 protocol, a USB 2.0 protocol, or a Serial Advanced Technology Attachment (SATA) protocol.

13. The method of claim 10, wherein the communication port clock signals comprise one of more of a 12 MHz signal adapted to be used with a USB 2.0 port, a 25 MHz signal adapted to be used with a USB 3.0 port or a Serial Advanced Technology Attachment (SATA) port, or a 100 MHz signal adapted to be used with a USB 3.0 port or a SATA port.

14. The method of claim 10, wherein at least one of the dividers comprises a phase locked loop (PLL).

15. The method of claim 10, wherein the communication port clock signal provided by the configurable divider exhibits a frequency determined by an average of the ratios of the pattern.

16. The method of claim 10, wherein at least two of the ratios of the pattern are the same ratio to reduce jitter in the communication port clock signal.

17. The method of claim 10, wherein the reference clock signal is a 25 MHz signal, a 100 MHz signal, or a 150 MHz signal.

18. The method of claim 10, wherein the reference clock signal generator is a first reference clock signal generator, the reference clock signal is a first reference clock signal at
a first frequency, the dividers comprise a first set of dividers, and the different ratios comprise a first set of different ratios, the method further comprising:
providing a second reference clock signal using a second reference clock signal generator;
dividing the second reference clock signal using a second set of dividers configured with a second set of different ratios to provide the same communication port clock signals as the first set of dividers if the first reference clock signal is not available.

19. A system comprising:
means for providing a reference clock signal;
means for dividing the reference clock signal using different ratios to provide a plurality of communication port clock signals, wherein at least one of the plurality of communication port clock signals is generated by alternating the different ratios that are used in a repeating pattern; and
a plurality of different communication ports, each one adapted to receive a single one of the communication port clock signals and adapted to operate in accordance with different communication protocols using the communication port clock signals, wherein at least two of the plurality of different communication ports receive different ones of said plurality of communication port clock signals.

20. The system of claim 1, wherein at least one of the ratios is a fractional non-integer ratio having a decimal representation that is a repeating decimal.

21. The method of claim 10, wherein at least one of the ratios is a fractional non-integer ratio having a decimal representation that is a repeating decimal.

22. The system of claim 1, further comprising a multiplexer for selecting one of the plurality of communication port clock signals as said single one of the communication port clock signals.

23. The method of claim 10, further comprising selecting one of the plurality of communication port clock signals as said single one of the communication port clock signals.

* * * * *